(12) United States Patent
Bandhauer et al.

(10) Patent No.: US 7,858,256 B2
(45) Date of Patent: Dec. 28, 2010

(54) HIGH TEMPERATURE FUEL CELL SYSTEM WITH INTEGRATED HEAT EXCHANGER NETWORK

(75) Inventors: Todd M. Bandhauer, Racine, WI (US); Michael J. Reinke, Franklin, WI (US); Jeroen Valensa, Muskego, WI (US)

(73) Assignee: Bloom Energy Corporation, Sunnyvale, CA (US)

( * ) Notice: Subject to any disclaimer, the term of this patent is extended or adjusted under 35 U.S.C. 154(b) by 1436 days.

(21) Appl. No.: 11/124,817

(22) Filed: May 9, 2005

(65) Prior Publication Data
US 2006/0251940 A1    Nov. 9, 2006

(51) Int. Cl.
*H01M 8/04* (2006.01)

(52) U.S. Cl. .............. 429/440; 429/428; 429/433; 429/434; 429/435; 429/436

(58) Field of Classification Search ........... None
See application file for complete search history.

(56) References Cited

U.S. PATENT DOCUMENTS

| | | | |
|---|---|---|---|
| 3,488,266 A | 1/1970 | French | |
| 4,041,210 A | 8/1977 | Van dine | |
| 4,182,795 A | 1/1980 | Baker et al. | |
| 4,333,992 A | 6/1982 | Healy | |
| 4,532,192 A | 7/1985 | Baker et al. | |
| 4,622,275 A | 11/1986 | Noguchi et al. | |
| 4,792,502 A | 12/1988 | Trocciola et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,079,105 A | 1/1992 | Bossel | |
| 5,082,752 A | 1/1992 | Koga et al. | |
| 5,084,362 A | 1/1992 | Farooque | |
| 5,094,926 A | 3/1992 | Kobayashi et al. | |
| 5,143,800 A | 9/1992 | George et al. | |
| 5,169,730 A | 12/1992 | Reichner et al. | |
| 5,170,124 A | 12/1992 | Blair et al. | |
| 5,198,311 A | 3/1993 | Nakazawa et al. | |
| 5,302,470 A | 4/1994 | Okada et al. | |

(Continued)

FOREIGN PATENT DOCUMENTS

CN    1377097    10/2002

(Continued)

OTHER PUBLICATIONS

European Search Report mailed May 29, 2009, in European Application No. 06759276.6.

(Continued)

*Primary Examiner*—Ula C Ruddock
*Assistant Examiner*—Tony Chuo
(74) *Attorney, Agent, or Firm*—The Marbury Law Group, PLLC

(57) ABSTRACT

A fuel cell system (1) is provided and includes a fuel cell stack (3) and a heat transfer device (5) adapted to transfer heat from a cathode exhaust stream of the fuel cell stack (3) to water to be provided to a fuel inlet stream.

14 Claims, 8 Drawing Sheets

U.S. PATENT DOCUMENTS

| | | | |
|---|---|---|---|
| 5,306,575 A * | 4/1994 | Camara et al. | 429/16 |
| 5,366,819 A | 11/1994 | Harvigsen et al. | |
| 5,441,821 A | 8/1995 | Merritt et al. | |
| 5,449,568 A | 9/1995 | Micheli et al. | |
| 5,498,487 A | 3/1996 | Ruka et al. | |
| 5,501,914 A | 3/1996 | Satake et al. | |
| 5,505,824 A | 4/1996 | Mcelroy | |
| 5,527,631 A | 6/1996 | Singh et al. | |
| 5,573,867 A | 11/1996 | Zafred et al. | |
| 5,601,937 A | 2/1997 | Isenberg | |
| 5,686,196 A | 11/1997 | Singh et al. | |
| 5,733,675 A | 3/1998 | Dederer et al. | |
| 5,741,605 A | 4/1998 | Gillett et al. | |
| 5,763,114 A | 6/1998 | Khandkar et al. | |
| 5,914,200 A * | 6/1999 | Schabert et al. | 429/34 |
| 5,955,039 A | 9/1999 | Dowdy | |
| 5,968,680 A | 10/1999 | Wolfe et al. | |
| 6,013,385 A | 1/2000 | Dubose | |
| 6,051,125 A | 4/2000 | Pham et al. | |
| 6,066,408 A | 5/2000 | Vitale et al. | |
| 6,124,050 A | 9/2000 | Stock | |
| 6,280,865 B1 | 8/2001 | Eisman et al. | |
| 6,329,090 B1 | 12/2001 | Mcelroy et al. | |
| 6,348,278 B1 | 2/2002 | Lapierre et al. | |
| 6,403,245 B1 | 6/2002 | Hunt | |
| 6,436,562 B1 | 8/2002 | Dubose | |
| 6,451,466 B1 | 9/2002 | Grasso et al. | |
| 6,514,634 B1 * | 2/2003 | Rush, Jr. | 429/17 |
| 6,531,243 B2 | 3/2003 | Thom | |
| 6,623,880 B1 | 9/2003 | Geisbrecht et al. | |
| 6,630,264 B2 | 10/2003 | Haltiner, Jr. et al. | |
| 6,720,099 B1 | 4/2004 | Haltiner, Jr. | |
| 6,749,958 B2 | 6/2004 | Pastula et al. | |
| 6,759,155 B2 | 7/2004 | Haltiner, Jr. | |
| 6,811,913 B2 | 11/2004 | Ruhl | |
| 6,821,663 B2 | 11/2004 | Mcelroy | |
| 6,854,688 B2 | 2/2005 | McElroy et al. | |
| 6,861,169 B2 | 3/2005 | Hagan et al. | |
| 6,878,474 B2 | 4/2005 | Dickman et al. | |
| 6,924,053 B2 | 8/2005 | Mcelroy et al. | |
| 7,045,238 B2 | 5/2006 | Gottmann et al. | |
| 7,060,382 B2 | 6/2006 | Jahnke et al. | |
| 7,063,047 B2 | 6/2006 | Reinke et al. | |
| 7,069,981 B2 | 7/2006 | Valensa et al. | |
| 7,087,331 B2 | 8/2006 | Keefer et al. | |
| 7,255,804 B2 | 8/2007 | Prather et al. | |
| 7,285,350 B2 | 10/2007 | Keefer et al. | |
| 7,294,421 B2 | 11/2007 | Noetzel et al. | |
| 7,364,810 B2 | 4/2008 | Sridhar et al. | |
| 7,410,713 B2 | 8/2008 | Balan et al. | |
| 7,422,810 B2 | 9/2008 | Venkataraman et al. | |
| 7,482,078 B2 | 1/2009 | Sridhar et al. | |
| 7,575,822 B2 | 8/2009 | Mitlitsky et al. | |
| 2001/0049035 A1 | 12/2001 | Haltiner, Jr. et al. | |
| 2002/0025463 A1 * | 2/2002 | Derflinger et al. | 429/19 |
| 2002/0028362 A1 | 3/2002 | Prediger et al. | |
| 2002/0028366 A1 | 3/2002 | Haltiner, Jr. | |
| 2002/0058175 A1 | 5/2002 | Ruhl | |
| 2002/0106544 A1 | 8/2002 | Noetzel et al. | |
| 2002/0142208 A1 | 10/2002 | Keefer et al. | |
| 2002/0172630 A1 | 11/2002 | Ahmed et al. | |
| 2002/0172846 A1 * | 11/2002 | Hagan et al. | 429/20 |
| 2003/0031904 A1 | 2/2003 | Haltiner | |
| 2003/0049502 A1 | 3/2003 | Dickman | |
| 2003/0054215 A1 | 3/2003 | Doshi et al. | |
| 2003/0157386 A1 | 8/2003 | Gottmann et al. | |
| 2003/0162067 A1 | 8/2003 | Mcelroy | |
| 2003/0177771 A1 | 9/2003 | Maisotsenko et al. | |
| 2003/0196893 A1 | 10/2003 | Mcelroy et al. | |
| 2003/0205641 A1 | 11/2003 | Mcelroy et al. | |
| 2004/0089438 A1 | 5/2004 | Valensa et al. | |
| 2004/0131912 A1 | 7/2004 | Keefer | |
| 2004/0191597 A1 | 9/2004 | Mcelroy | |
| 2004/0191598 A1 | 9/2004 | Gottmann | |
| 2004/0197612 A1 | 10/2004 | Keefer et al. | |
| 2004/0202914 A1 | 10/2004 | Sridhar et al. | |
| 2004/0224193 A1 | 11/2004 | Mitlitsky et al. | |
| 2004/0229102 A1 * | 11/2004 | Jahnke et al. | 429/34 |
| 2004/0241513 A1 | 12/2004 | Issacci et al. | |
| 2005/0048334 A1 | 3/2005 | Sridhar et al. | |
| 2005/0048338 A1 | 3/2005 | Kobayashi et al. | |
| 2005/0056412 A1 | 3/2005 | Reinke et al. | |
| 2005/0123810 A1 | 6/2005 | Balan | |
| 2005/0164051 A1 | 7/2005 | Venkataraman et al. | |
| 2005/0221137 A1 * | 10/2005 | Bandhauer et al. | 429/24 |
| 2006/0147771 A1 | 7/2006 | Russell et al. | |
| 2006/0246333 A1 | 11/2006 | Schaetitz et al. | |
| 2006/0248799 A1 | 11/2006 | Bandhauer et al. | |
| 2006/0251934 A1 | 11/2006 | Valensa et al. | |
| 2006/0251939 A1 | 11/2006 | Bandhauer et al. | |
| 2006/0251940 A1 | 11/2006 | Bandhauer et al. | |
| 2006/0257709 A1 | 11/2006 | Blum et al. | |
| 2008/0020247 A1 | 1/2008 | Valensa et al. | |
| 2008/0118800 A1 | 5/2008 | Devriendt et al. | |

FOREIGN PATENT DOCUMENTS

| | | |
|---|---|---|
| CN | 1516310 A | 7/2004 |
| EP | 0 467 051 A1 | 1/1992 |
| WO | WO 2004/013258 | 2/2004 |
| WO | WO 2004/021497 A2 | 3/2004 |
| WO | WO 2004/027912 A2 | 4/2004 |
| WO | WO 2004/093214 | 10/2004 |

OTHER PUBLICATIONS

Translation of Office Action mailed Sep. 23, 2009, in Chinese Application No. 200610077859.8.

First Examination Report mailed Feb. 4, 2010, in India Application No. 2082/KOLNP/2006.

Office Action mailed Aug. 4, 2009, in U.S. Appl. No. 11/124,810.

Office Action mailed Dec. 14, 2009, in U.S. Appl. No. 11/124,810.

Office Action mailed Jan. 22, 2009, in U.S. Appl. No. 11/124,810.

Office Action mailed Mar. 14, 2008, in U.S. Appl. No. 11/124,811.

Office Action mailed Dec. 1, 2008, in U.S. Appl. No. 11/124,811.

Austin, "Cell and Stack Construction: Low-Temperature Cells," *Fuel Cells: A Review of Government-Sponsored Research*, 1950-1964, NASA SP-120, pp. 101-102, (1967).

"Low Cost, Compact Solid Oxide Fuel Cell Generator," (Technology Management Inc.).

"Low Cost, High Efficiency Reversible Fuel Cell (and Electrolyer) Systems," (Technology Management Inc.), Proceedings of the 2001 DOE Hydrogen Program Review NREL/CP-570-30535, pp. 1-7, (2001).

Milliken et al., "Low Cost, High Efficiency Reversible Fuel Cell Systems," Proceedings of the 2002 U.S. DOE Hydrogen Program Review, NREL/CP-610-32405, pp. 1-14, (2002).

Mitlitsky, et al., "Regenerative Fuel Cells for High Altitude Long Endurance Solar Powered Aircraft," Intersociety Energy Conversion Engineering Conference (IECEC), UCRL-JC-113485, pp. 1-8, (Jul. 28, 1993).

Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).

Ruhl, "Low Cost Reversible Fuel Cell System," Proceedings of the 2000 U.S. DOE Hydrogen Program Review, NREL/CP-570-28890, pp. 1-9, (Jun. 15, 2000).

"Small, Ultra Efficient Fuel Cell Systems," (Technology Management Inc.), Advanced Technology Program ATP 2001 Competition, pp. 1-2, (Jun. 2002).

Office Action mailed Apr. 29, 2010 in U.S. Appl. No. 11/124,810.

Translated portion of Office Action mailed Apr. 8, 2010 in Chinese Application No. 200610077859.8.

* cited by examiner

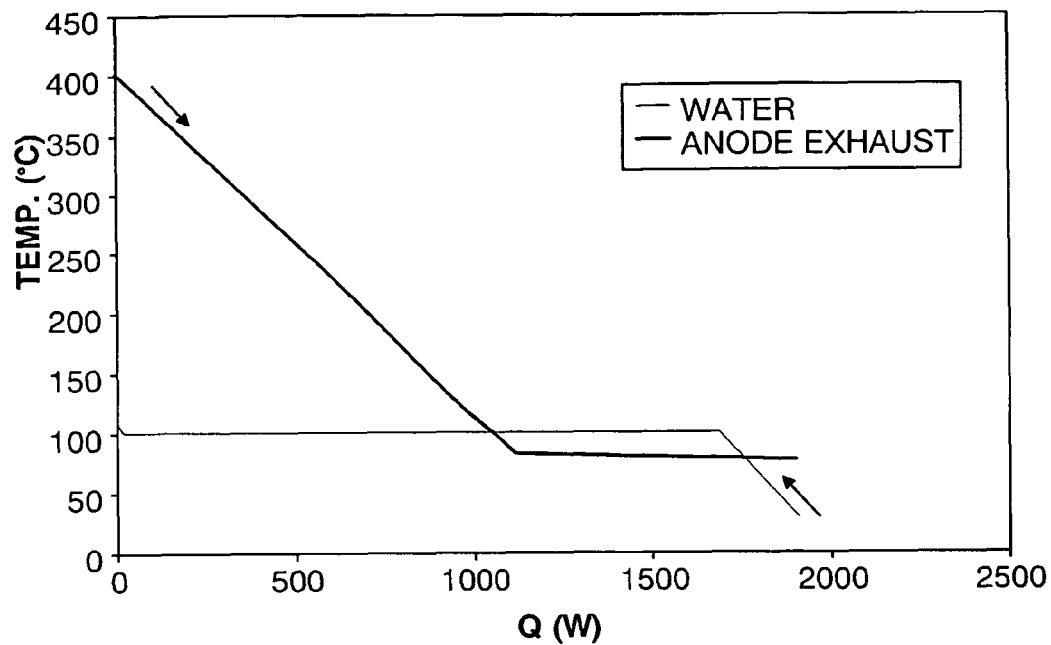
Fig. 1 POST-WGS ANODE EXHAUST AND WATER TEMPERATURE VS. HEAT TRANSFERED
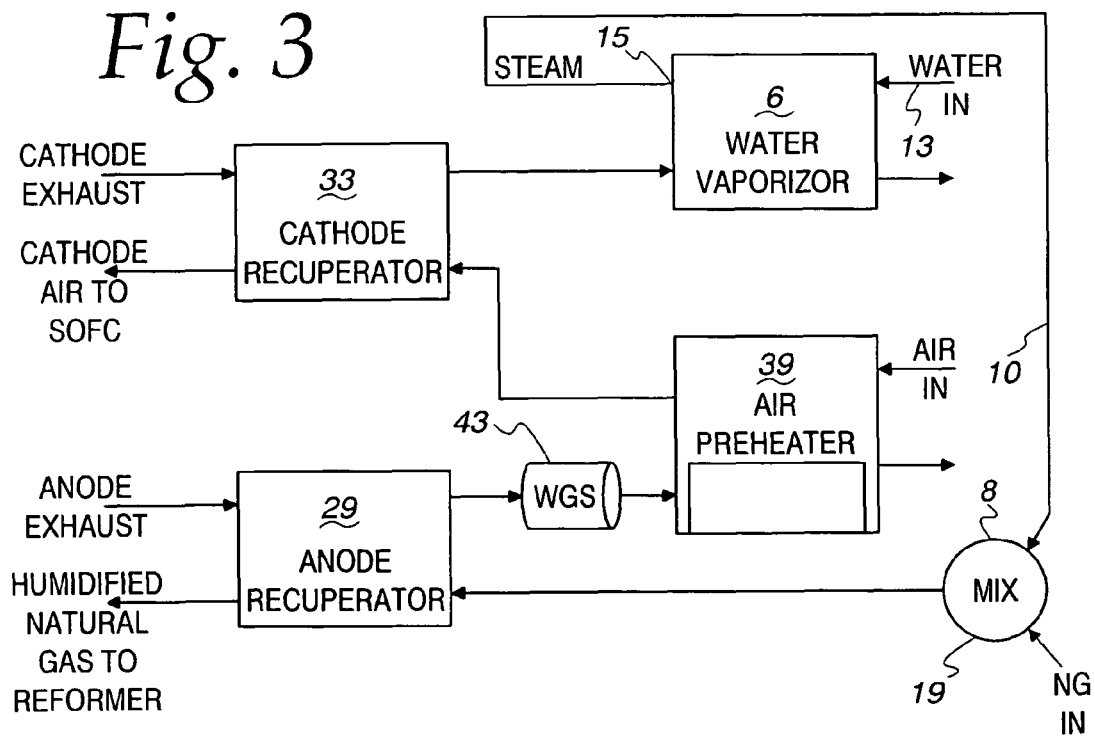
Fig. 3

HIGH TEMPERATURE FUEL CELL SYSTEM WITH INTEGRATED HEAT EXCHANGER NETWORK

BACKGROUND OF THE INVENTION

The present invention is generally directed to fuel cells and more specifically to high temperature fuel cell systems and their operation.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

In a high temperature fuel cell system such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

BRIEF SUMMARY OF THE INVENTION

In one aspect of the present invention, a fuel cell system is provided and includes a fuel cell stack and a heat transfer device adapted to transfer heat from a cathode exhaust stream of the fuel cell stack to water to be provided to a fuel inlet stream.

In one aspect, the heat transfer device includes a water evaporator adapted to convert liquid water to steam. The evaporator includes a first input operatively connected to a cathode exhaust outlet of the fuel cell stack, a second input operatively connected to a water source, and a first output operatively connected to a fuel inlet of the fuel cell stack.

In a further aspect, the system further includes a fuel preheater heat exchanger which includes a first input operatively connected to the cathode exhaust outlet of the fuel cell stack, a second input operatively connected to a fuel source, and a first outlet operatively connected to a fuel cell stack.

In yet a further aspect, the fuel preheater heat exchanger is adapted to transfer heat from the cathode exhaust stream of the fuel cell stack to the fuel inlet stream being provided to the fuel cell stack.

As a further aspect, the evaporator includes a co-flow evaporator in which the cathode exhaust stream and the water are adapted to flow in a same direction, and an output of the evaporator is operatively connected to an inlet of the fuel preheater heat exchanger such that the cathode exhaust stream flows from the evaporator into the fuel preheater heat exchanger.

In accordance with one aspect, the system further includes an air preheater which is adapted to preheat an air inlet stream using heat from an anode exhaust stream.

In a further aspect, the air preheater is adapted to partially condense the water vapor in the anode exhaust stream prior to the anode exhaust stream entering a condenser.

In accordance with one aspect of the invention, a fuel cell system includes a fuel cell stack, a first means for evaporating water to steam using heat from a fuel cell stack cathode exhaust stream, and a second means for providing the steam into a fuel inlet stream being directed to the fuel cell stack.

According to one aspect of the invention, a method is provided for operating a fuel cell system. The method includes the steps of operating the fuel cell stack to generate electricity, evaporating water to steam using heat from a fuel cell stack cathode exhaust stream, and providing the steam into a fuel inlet stream being directed to the fuel cell stack.

According to one aspect, the method further includes the step of heating an air inlet stream using the cathode exhaust stream upstream of evaporating the water.

In one further aspect, the method further includes heating the air inlet stream using a fuel cell stack anode exhaust stream prior to heating the air inlet stream using the cathode exhaust stream.

In a further aspect, the method further includes the step of partially condensing water vapor in the anode exhaust stream during the heating of the air inlet stream.

According to one aspect, the method further includes preheating the fuel inlet stream with the cathode exhaust stream downstream of evaporating the water.

In one aspect, the step of evaporating includes flowing the cathode exhaust stream and the water in a same direction in an evaporator.

As one aspect, the method further includes mixing the steam and the fuel inlet stream, heating the steam and fuel mix using heat from a fuel cell stack anode exhaust stream, and providing the steam and fuel fix into a reformer.

In accordance with one aspect of the invention, a fuel cell system includes a fuel cell stack, and a concurrent flow water evaporator which is adapted to transfer heat from a cathode exhaust stream to water to be provided to a fuel inlet stream.

As a further aspect, the system further includes a fuel preheater, a cathode exhaust stream output of the evaporator operatively connected to the fuel preheater such that the cathode exhaust stream flows from the evaporator into the fuel preheater.

In accordance with one aspect of the invention, a fuel cell system includes a fuel cell stack, and a first means for transferring heat from a cathode exhaust stream to water to be provided to a fuel inlet stream, such that the cathode exhaust stream and the water flow in a same direction in the first means.

In accordance with one aspect of the invention, a method is provided for operating a fuel cell system. The method includes the steps of flowing a cathode exhaust stream and a water stream in concurrent flow relationship, evaporating the water to steam using heat from the cathode exhaust stream while flowing in the concurrent flow relationship, and providing the steam into a fuel inlet stream being directed into a fuel cell stack.

In accordance with one aspect of the invention, a fuel cell system includes a fuel cell stack, a heat transfer device adapted to transfer heat from a cathode exhaust stream of the fuel cell stack to water to be provided to a fuel inlet stream, an air preheater which is adapted to preheat an air inlet stream using heat from an anode exhaust stream, and a cathode recuperator heat exchanger which is adapted to transfer heat from the cathode exhaust stream to the air inlet stream. The cathode recuperator is operatively connected upstream from the heat transfer device with respect to the cathode exhaust stream flow and downstream from the air preheater with respect to the air inlet stream flow. Further, the cathode recuperator heat exchanger is sized to provide a cathode exhaust stream to the heat transfer device that is sufficiently high temperature to allow for evaporation of the water in the heat transfer device.

Other objects, features, and advantages of the invention will become apparent from a review of the entire specification, including the appended claims and drawings.

BRIEF DESCRIPTION OF THE DRAWINGS

FIG. 1 is a plot of temperature versus heat for fluid flow in a system of a comparative example.

FIGS. 2 and 3 are schematics of fuel cell systems according to the first preferred embodiment of the present invention. FIG. 2 is a system components and flow diagram and FIG. 3 shows the schematic of the heat exchanger network for the fuel cell system.

DETAILED DESCRIPTION OF THE PREFERRED EMBODIMENTS

Figure 2:
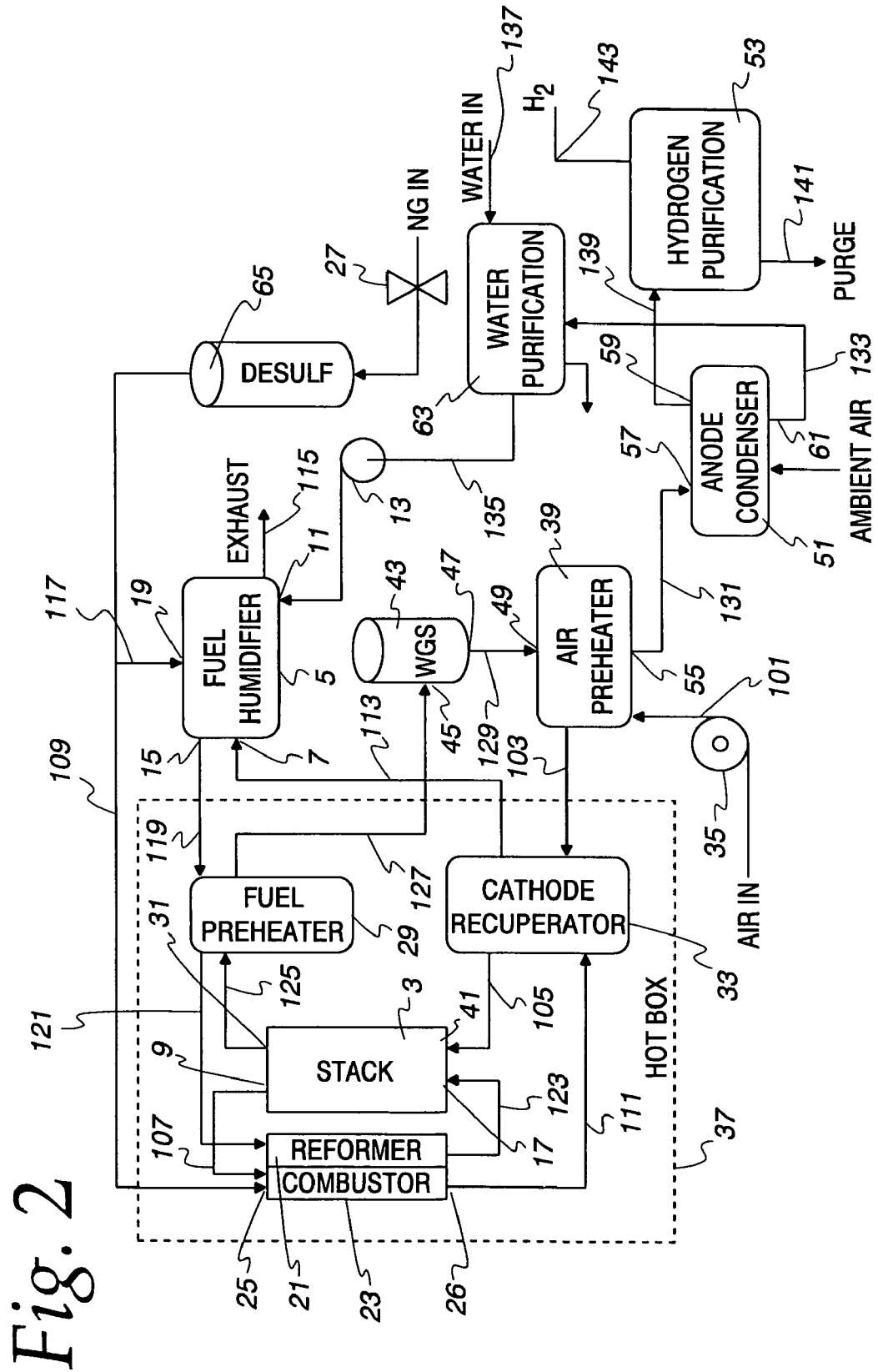

In order to maintain the SOFC at its elevated operating temperature, the anode and cathode flow streams exiting the fuel cell typically transfer heat to the incoming flows through a series of recuperative heat exchangers. In a comparative example, this can include the process of transferring heat to a liquid water source in order to generate steam for steam reforming of a hydrocarbon fuel in order to generate the hydrogen-rich reformate flow.

For example, the cathode heat may be recuperatively transferred from the cathode exhaust flow stream to the incoming cathode air, while the anode heat is partially recuperatively transferred from the anode exhaust to the incoming humidified fuel, such as natural gas, which feeds the steam reformer, and partially transferred to the water to generate the water vapor being provided into the fuel to humidify the fuel. In addition, the water vapor within the anode exhaust may be recaptured to serve either wholly or in part as the water source for the steam reformer.

The inventors discovered that a thermodynamic analysis of the system in which the anode (i.e., fuel side) exhaust stream is used to heat the humidified fuel and to evaporate the water reveals that there will be more energy available in the anode exhaust exiting the fuel cell than is required to be transferred to the incoming humidified fuel (i.e., water and fuel). However, a sizable portion of both the heat available in the anode exhaust and the heat required for the feed is in the form of latent heat. The result is that, while there is sufficient energy available in the anode exhaust, attempts to transfer the heat from the anode exhaust to the water and natural gas via a heat exchanger, in which the heat is transferred by convection from the anode exhaust stream to a thermally conductive surface separating the exhaust stream and one or more of the incoming fluids, and from said surface to the one or more of the incoming fluids, may not be commercially practical.

The above described problem is illustrated in FIG. 1, which shows the plot of temperature versus heat transferred for the anode exhaust and the water. The conditions in FIG. 1 assume a 400° C. anode exhaust temperature entering an evaporator (i.e., vaporizer) from a water-gas shift reactor, and a hypothetical counter flow evaporator capable of achieving full vaporization of the water, with minimal superheat.

As can be seen in FIG. 1, the condensing of water vapor from the fully saturated anode exhaust and the isothermal vaporization of the water causes the temperature of the heat rejecting anode exhaust to drop below the temperature of the heat receiving water for a substantial portion of the heat duty (i.e., the water curve is located above the anode exhaust curve for Q values of about 1,100 to about 1750 W). As a result, achieving the required heat transfer between the fluids solely by use of typical heat exchangers may not be feasible for the conditions assumed in FIG. 1, since the transfer of heat in a typical heat exchanger requires the temperature of the thermally conductive separating material to be less than the local bulk fluid temperature of the heat rejecting fluid, and higher than the local bulk fluid temperature of the heat receiving fluid.

Therefore, an additional heating source may be needed to evaporate sufficient water to satisfy the amount of steam required for methane reformation, which can be as high as 1.5 kW in a system with 6.5 kW electrical output. This additional heating source reduces system efficiency.

The inventors discovered that the cathode (i.e., air side) exhaust may be used to evaporate water being provided into the fuel and/or to heat the fuel being provided into the system. By using this alternative approach to the recapture of heat energy in the SOFC fuel cell system, the entire thermodynamic potential of the exhaust gases can be recaptured for preheating of the fuel cell feeds without mass transfer devices such as an enthalpy wheel, or additional heat sources. However, in some systems utilizing this alternative approach, it still may be desirable to utilize mass transfer devices such as an enthalpy wheel, or additional heat sources. The system where the cathode exhaust is used to vaporize water for humidifying the fuel and/or used to heat incoming fuel is also be capable of being passively controlled. However, in some systems where the cathode exhaust is used to vaporize water for humidifying the fuel and/or used to heat incoming fuel, it may be desirable to utilize active control.

FIGS. 2 and 3 illustrate a fuel cell system 1 according to a first preferred embodiment of the invention. Preferably, the system 1 is a high temperature fuel cell stack system, such as a solid oxide fuel cell (SOFC) system or a molten carbonate fuel cell system. The system 1 may be a regenerative system, such as a solid oxide regenerative fuel cell (SORFC) system which operates in both fuel cell (i.e., discharge) and electrolysis (i.e., charge) modes or it may be a non-regenerative system which only operates in the fuel cell mode.

The system 1 contains one or more high temperature fuel cell stacks 3. The stack 3 may contain a plurality of SOFCs, SORFCs or molten carbonate fuel cells. Each fuel cell contains an electrolyte, an anode electrode on one side of the electrolyte in an anode chamber, a cathode electrode on the other side of the electrolyte in a cathode chamber, as well as other components, such as separator plates/electrical contacts, fuel cell housing and insulation. In a SOFC operating in the fuel cell mode, the oxidizer, such as air or oxygen gas, enters the cathode chamber, while the fuel, such as hydrogen or hydrocarbon fuel, enters the anode chamber. Any suitable fuel cell designs and component materials may be used.

The system 1 also contains a heat transfer device 5 labeled as a fuel humidifier in FIG. 2. The device 5 is adapted to transfer heat from a cathode exhaust of the fuel cell stack 3 to evaporate water to be provided to the fuel inlet stream and to also mix the fuel inlet stream with steam (i.e., the evaporated water). Preferably, the heat transfer device 5 contains a water evaporator (i.e., vaporizer) 6 which is adapted to evaporate water using the heat from the cathode exhaust stream. The evaporator 6 contains a first input 7 operatively connected to a cathode exhaust outlet 9 of the fuel cell stack 3, a second input 11 operatively connected to a water source 13, and a first output 15 operatively connected to a fuel inlet 17 of the stack 3. The heat transfer device 5 also contains a fuel-steam mixer 8 which mixes the steam or water vapor, provided into the mixer 8 from the first output 15 of the evaporator 6 through conduit 10, and the input fuel, such as methane or natural gas, provided from a fuel inlet 19, as shown in FIG. 3.

The term "operatively connected" means that components which are operatively connected may be directly or indirectly connected to each other. For example, two components may be directly connected to each other by a fluid (i.e., gas and/or liquid) conduit. Alternatively, two components may be indirectly connected to each other such that a fluid stream passes between the first component to the second component through one or more additional components of the system.

The system 1 also preferably contains a reformer 21 and a combustor 23. The reformer 21 is adapted to reform a hydrocarbon fuel to a hydrogen containing reaction product and to provide the reaction product to the fuel cell stack 3. The combustor 23 is preferably thermally integrated with the reformer 21 to provide heat to the reformer 21. The fuel cell stack 3 cathode exhaust outlet 9 is preferably operatively connected to an inlet 25 of the combustor 23. Furthermore, a hydrocarbon fuel source 27 is also operatively connected to the combustor 23 inlet 25.

The hydrocarbon fuel reformer 21 may be any suitable device which is capable of partially or wholly reforming a hydrocarbon fuel to form a carbon containing and free hydrogen containing fuel. For example, the fuel reformer 21 may be any suitable device which can reform a hydrocarbon gas into a gas mixture of free hydrogen and a carbon containing gas. For example, the fuel reformer 21 may reform a humidified biogas, such as natural gas, to form free hydrogen, carbon monoxide, carbon dioxide, water vapor and optionally a residual amount of unreformed biogas by a steam methane reformation (SMR) reaction. The free hydrogen and carbon monoxide are then provided into the fuel inlet 17 of the fuel cell stack 3. Preferably, the fuel reformer 21 is thermally integrated with the fuel cell stack 3 to support the endothermic reaction in the reformer 21 and to cool the stack 3. The term "thermally integrated" in this context means that the heat from the reaction in the fuel cell stack 3 drives the net endothermic fuel reformation in the fuel reformer 21. The fuel reformer 21 may be thermally integrated with the fuel cell stack 3 by placing the reformer and stack in the same hot box 37 and/or in thermal contact with each other, or by providing a thermal conduit or thermally conductive material which connects the stack to the reformer.

The combustor 23 provides a supplemental heat to the reformer 21 to carry out the SMR reaction during steady state operation. The combustor 23 may be any suitable burner which is thermally integrated with the reformer 21. The combustor 23 receives the hydrocarbon fuel, such as natural gas, and an oxidizer (i.e., air or other oxygen containing gas), such as the stack 3 cathode exhaust stream, through inlet 25. However, other sources of oxidizer besides the cathode exhaust stream may be provided into the combustor. The fuel and the cathode exhaust stream (i.e., hot air) are combusted in the combustor to generate heat for heating the reformer 21. The combustor outlet 26 is operatively connected to the inlet 7 of the heat transfer device 5 to provide the cathode exhaust mixed with the combusted fuel components from the combustor to the heat transfer device 5. While the illustrated system 1 utilizes a cathode exhaust flow in the heat transfer device 5 that has passed through a combustor, it may be desirable in some systems to utilize a cathode exhaust flow in the heat transfer device 5 that has not been passed through a combustor.

Preferably, the supplemental heat to the reformer 21 is provided from both the combustor 23 which is operating during steady state operation of the reformer (and not just during start-up) and from the cathode (i.e., air) exhaust stream of the stack 3. Most preferably, the combustor 23 is in direct contact with the reformer 21, and the stack 3 cathode exhaust is configured such that the cathode exhaust stream contacts the reformer 21 and/or wraps around the reformer 21 to facilitate additional heat transfer. This lowers the combustion heat requirement for SMR.

Preferably, the reformer 21 is sandwiched between the combustor 23 and one or more stacks 3 to assist heat transfer. When no heat is required by the reformer, the combustor unit acts as a heat exchanger. Thus, the same combustor 23 may be used in both start-up and steady-state operation of the system 1.

The system 1 also includes a fuel preheater heat exchanger (i.e., anode recuperator) 29 which is adapted to heat the fuel inlet stream using heat from the fuel cell stack 3 anode exhaust stream exiting from the stack 3 anode exhaust outlet 31. The system 1 further includes a cathode recuperator heat exchanger 33 which is adapted to heat an air inlet stream from an air blower 35 using heat from the cathode exhaust stream exiting the stack 3 cathode exhaust outlet 9. Preferably, the cathode exhaust stream mixed with the combusted fuel components from combustor 23 outlet 26 are provided into the cathode recuperator 33 to heat the air inlet stream. The cathode exhaust stream mixed with the combusted fuel components are then provided to the evaporator 6 of the heat transfer device 5 to evaporate the water to steam, which will then be provided into the fuel inlet stream heading into the reformer 21.

Preferably, the fuel cell stack 3, the reformer 21, the combustor 23, the fuel preheater heat exchanger 29 and the cathode recuperator heat exchanger 33 are located in a hot box 37. Preferably, the cathode recuperator heat exchanger 33 is intentionally undersized to ensure that the temperature of the cathode exhaust stream exiting the heat exchanger 33 is sufficiently high to allow the heat transfer device 5 to evaporate the water to steam via transfer of heat from the cathode exhaust stream. For example, in one highly preferred embodiment, the cathode recuperator heat exchanger preferably has a size below a predetermined size, such that the cathode exhaust stream exits the cathode recuperator heat exchanger at a temperature of at least 200° C., such as 200° C. to 230° C., for example about 210° C. In this highly preferred embodiment, the cathode exhaust stream may enter the cathode recuperator heat exchanger 33 at a temperature of at least 800° C., such as about 800° C. to about 850° C., for example about 820° C. The cathode recuperator heat exchanger 33 is intentionally undersized to have an exchange rate of about 10 to 12 kW, such as about 11 kW for this highly preferred embodiment. In contrast, a full sized heat exchanger for the highly preferred embodiment may have an exchange rate of about 16 kW. While specific temperatures and heat exchange rates have been described for one highly preferred embodiment, it should be understood that the exit and entrance temperatures and heat exchange rates will be highly dependent upon the particular parameters of each specific application, and accordingly, it should be understood that no limitations to specific exit and entrance temperatures or heat exchange rates are intended unless specifically recited in the claims.

The system 1 also preferably contains an air preheater heat exchanger 39 which is adapted to preheat the air inlet stream from the air blower 35 using heat from an anode exhaust stream exiting from the stack anode outlet 31. Preferably, the air blower provides an air inlet stream into the system 1 which comprises at least 2.5 times, such as 2.5 to 6.5 times, preferably 3 to 4.5 times as much air as required for the fuel cell stack 3 to generate electricity. For example, the blower 35 may preheat the air inlet stream to about 50° C. The slightly preheated inlet air stream is then provided from the blower into the air preheater heat exchanger 39 where it is preheated to about 100° C. to about 150° C., such as about 140° C., for example. This preheated air inlet stream then enters the cathode recuperator heat exchanger 33 at about 100° C. to about 150° C. and exits the heat exchanger 33 at about 700° C. to about 750° C., such as about 720° C. Since the preheated air inlet stream enters the cathode recuperator heat exchanger 33 at a temperature above room temperature, the cathode exhaust stream can exit the heat exchanger 33 at a temperature above 200° C. Thus, the air preheater heat exchanger 39 sufficiently preheats the air inlet stream to allow the use of an undersized cathode recuperator heat exchanger 33, which reduces the overall system manufacturing cost.

Preferably, the air preheater 39 is located outside the hot box 37 and upstream of the cathode recuperator 33, such that the air inlet stream is first heated by the anode exhaust stream in the air preheater 39, followed by being heated by the cathode exhaust stream in the cathode recuperator 33. Thus, the air inlet stream provided into the cathode inlet 41 of the stack 3 is heated by both the anode and cathode exhaust streams from the stack 3.

The system 1 optionally contains a water gas shift reactor 43 which is adapted to convert at least a portion of water vapor in the fuel cell stack anode exhaust stream into free hydrogen. Thus, the inlet 45 of the reactor 43 is operatively connected to the stack anode outlet 31, and the outlet 47 of the reactor 43 is operatively connected to an inlet 49 of the air preheater 39. The water-gas shift reactor 43 may be any suitable device which converts at least a portion of the water exiting the fuel cell stack 3 fuel exhaust outlet 31 into free hydrogen. For example, the reactor 43 may comprise a tube or conduit containing a catalyst which converts some or all of the carbon monoxide and water vapor in the anode exhaust stream into carbon dioxide and hydrogen. The catalyst may be any suitable catalyst, such as an iron oxide or a chromium promoted iron oxide catalyst.

The system 1 also optionally contains a condenser 51 adapted to condense water vapor in the anode exhaust stream into liquid water, preferably using an ambient air flow as a heatsink. The system 1 also optionally contains a hydrogen recovery system 53 adapted to recover hydrogen from the anode exhaust stream after the anode exhaust stream passes through the condenser 51. The hydrogen recovery system may be a pressure swing adsorption system or another suitable gas separation system, for example. Preferably, the air preheater 39 partially condenses the water vapor in the anode exhaust stream prior to the anode exhaust stream entering the condenser 51 to reduce the load on the condenser 51. Thus, the outlet 55 of the air preheater 39 is operatively connected to the inlet 57 of the condenser 51. A first outlet 59 of the condenser 51 provides hydrogen and other gases separated from the water to the hydrogen recovery system 53. A second outlet 61 of the condenser 51 provides water to an optional water purification system 63. The water from the purification system 63 is provided to the evaporator 6 which comprises a portion of the heat transfer device 5, through inlet 11.

The system 1 also optionally contains a desulfurizer 65 located in the path of the fuel inlet stream from the fuel source 27. The desulfurizer 65 removes some or all of the sulfur from the fuel inlet stream. The desulfurizer 65 preferably comprises the catalyst, such as Co—Mo or other suitable catalysts, which produces $CH_4$ and $H_2S$ gases from hydrogenated, sulfur containing natural gas fuel, and a sorbent bed, such as ZnO or other suitable materials, for removing the $H_2S$ gas from the fuel inlet stream. Thus, a sulfur free or reduced sulfur hydrocarbon fuel, such as methane or natural gas, leaves the desulfurizer 65.

A method of operating the system 1 according to a first preferred embodiment of the present invention is described with reference to FIGS. 2 and 3.

The air inlet stream is provided from the air blower 35 into the air preheater 39 through conduit 101. The air inlet stream is preheated in the air preheater 39 by exchanging heat with the anode exhaust stream coming from the water-gas shift reactor 43. The preheated air inlet stream is then provided into the cathode recuperator 33 through conduit 103, where the air inlet stream is heated to a higher temperature by exchanging heat with the cathode exhaust stream. The air inlet stream is then provided into the cathode inlet 41 of the stack 3 through conduit 105.

The air then exits the stack 3 cathode outlet 9 as the cathode exhaust stream. The cathode exhaust stream wraps around the reformer 21 and enters the combustion zone of the combustor 23 through conduit 107 and inlet 25. Desulfurized natural gas or another hydrocarbon fuel is also supplied from the fuel inlet 27 through conduit 109 into the combustor 23 inlet 25 for additional heating. The exhaust stream from the combustor 23 (i.e., cathode exhaust stream) then enters the cathode recuperator through conduit 111 where it exchanges heat with the incoming air.

The cathode exhaust stream is then provided into the evaporator 6 of the heat transfer device 5 through conduit 113. The rest of the heat left in the cathode exhaust stream is then extracted in the evaporator 6 for evaporating water for steam methane reformation before venting out through exhaust conduit 115.

On the fuel side, the hydrocarbon fuel inlet stream enters the desulfurizer 65 from the fuel source 27, such as a gas tank or a valved natural gas pipe. The desulfurized fuel inlet stream (i.e., desulfurized natural gas) then enters the fuel mixer 8 of the heat transfer device 5 through conduit 117. In the mixer 8, the fuel is mixed with purified steam from the evaporator 6.

The steam/fuel mix is then provided into the fuel preheater 29 through conduit 119. The steam/fuel mix is then heated by exchanging heat with the anode exhaust stream in the fuel preheater 29 before entering the reformer through conduit 121. The reformate then enters the stack 3 anode inlet 17 from the reformer 21 through conduit 123.

The stack anode exhaust stream exists the anode outlet 31 and is provided into the fuel preheater 29 through conduit 125, where it heats the incoming fuel/steam mix. The anode exhaust stream from the hot box 37 then enters the water gas shift reactor 43 through conduit 127. The anode exhaust stream from reactor 43 is then provided into the air preheater 39 through conduit 129, where it exchanges heat with the air inlet stream. The anode exhaust stream is then provided into the condenser 51 through conduit 131, where water is removed from the anode exhaust stream and recycled or discharged. For example, the water may be provided into the water purifier 63 through conduit 133, from where it is provided into the evaporator through conduit 135. Alternatively, water may be provided into the purifier 63 through a water inlet 137, such as a water pipe. The hydrogen rich anode exhaust is then provided from the condenser 51 through conduit 139 into the hydrogen purification system 53, where hydrogen is separated from the other gases in the stream. The other gases are purged through purge conduit 141 while hydrogen is provided for other uses or storage through conduit 143.

Thus, as described above, the fluid streams in the system 1 exchange heat in several different locations. The cathode exhaust stream is wrapped around the steam methane reformer 21 to supply the endothermic heat required for reformation. Then, natural gas or other hydrocarbon fuel is added directly to the cathode exhaust stream passing through the combustor 23 as needed to satisfy the overall heat requirement for reformation. Heat from the high-temperature exhaust exiting the combustor 23 (containing the cathode exhaust stream and the combusted fuel components, referred to as "cathode exhaust stream") is recuperated to the incoming cathode air (i.e., air inlet stream) in the cathode recuperator 33. The heat from the anode exhaust stream exiting the anode side of the fuel cell stack 3 is first recuperated to the incoming anode feed (i.e., the fuel inlet stream) in the fuel preheater 29 and then recuperated to the incoming cathode feed (i.e., the air inlet stream) in the air preheater 39.

Preferably, the air supplied to the fuel cell stack 3 from air blower 35 is provided in excess of the stoichiometric amount required for fuel cell reactions, in order to cool the stack and take away the heat produced by the stack. The typical ratio of air flow to stoichiometric amount is in excess of 4, such as 4.5 to 6, preferably about 5. This leads to substantially higher mass flow of cathode air than anode gas (i.e., fuel). Consequently, if the cathode exhaust stream only heats the air inlet stream, then the amount of heat which is transferred between the cathode exhaust and air inlet streams is significantly higher than that which is transferred between the anode exhaust and fuel inlet streams, typically by a factor of approximately 3.

The inventors discovered that rather than transferring all of the heat which is recaptured from the cathode exhaust stream directly to the incoming air, the system 1 transfers only a portion of the cathode exhaust stream heat to the incoming air inlet stream and uses the remainder of the available cathode exhaust stream heat for complete vaporization of the water in the evaporator 6.

Figure 4:
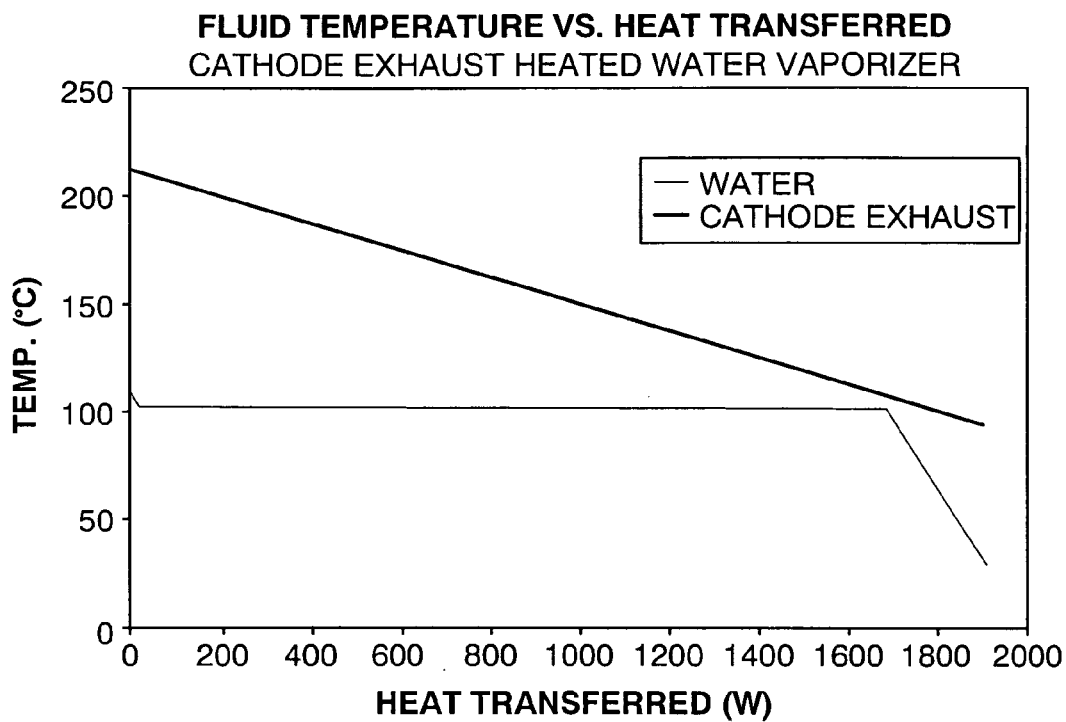
FIGS. 4, 5, 6 and 8 are plots of temperature versus heat for various fluid flows in systems of the preferred embodiments of the present invention.
Figure 5:
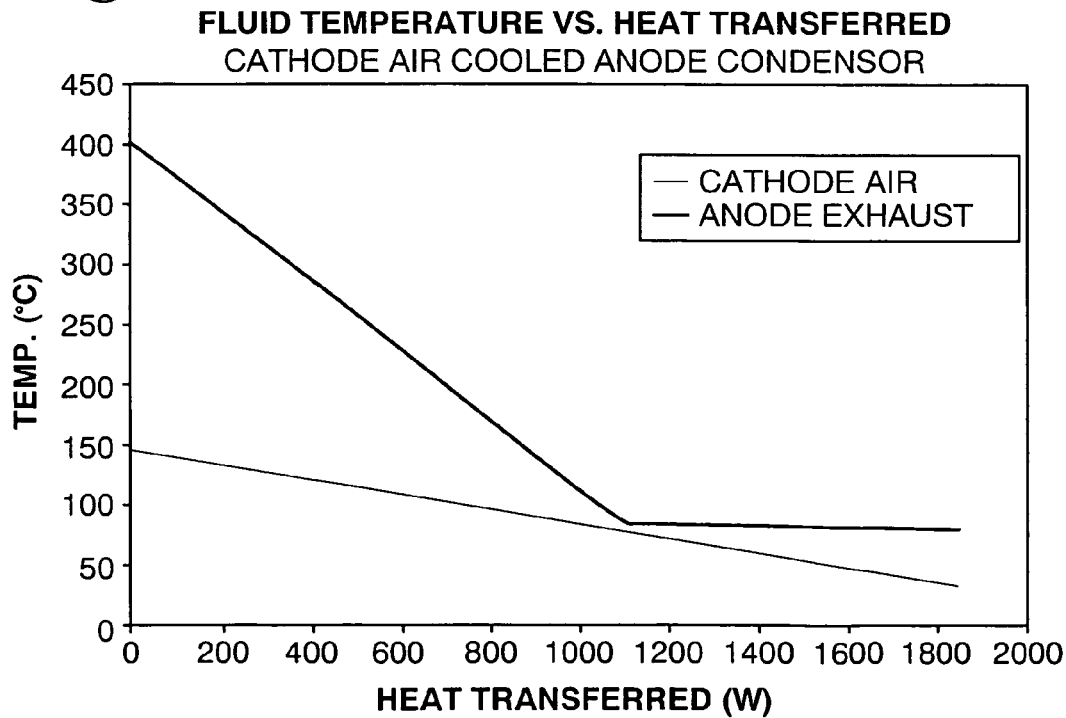

Thus, before the air inlet stream is heated to the appropriate fuel cell temperature, it is preheated by the anode exhaust stream in the air preheater 39. This preheating ensures that the air inlet stream has a sufficiently high temperature when entering the cathode recuperator 33 to ensure that the recuperator 33 can raise the temperature of the air inlet stream to the appropriate fuel cell temperature FIGS. 4 and 5 show graphs of the fluid temperature vs. the heat transferred for the evaporator 6 (i.e., the water vaporizer), and the air preheater 39, respectively, for one analyzed embodiment. As can be seen from the graphs in FIGS. 4 and 5, the thermodynamic cross-over shown in FIG. 1 is eliminated. This removes the need for either a humidity exchanger or a supplemental heater which consumes additional fuel.

In a heat exchanger, the "temperature approach" is defined as the smallest temperature difference between the two fluid streams at any location in the heat exchanger. As can be seen in FIGS. 4 and 5, both of the heat exchangers (i.e., the evaporator 6 and the air preheater 39) have a very small temperature approach, located away from either end of the heat exchanger at the point where the two-phase region begins. It is advantageous to maximize the temperature approach in each heat exchanger, since the rate of heat transfer between the fluids will decrease as the local temperature difference between the streams decreases, leading to a need for a larger heat exchanger to transfer the required heat.

If the portion of total cathode air preheat which occurs in the cathode recuperator 33 is decreased, the temperature approach will increase in the evaporator 6. However, the temperature approach will decrease in the air preheater 39. Conversely, if the portion of total cathode air preheat which occurs in the cathode recuperator 33 is increased, the temperature approach will increase in the air preheater 39. However, the temperature approach will decrease in the evaporator 6. Of the total cathode heat duty, there will then be some optimum percentage which should be transferred within the cathode recuperator 33 in order to maximize the temperature approach in both the evaporator 6 and the air preheater 39.

Figure 6:
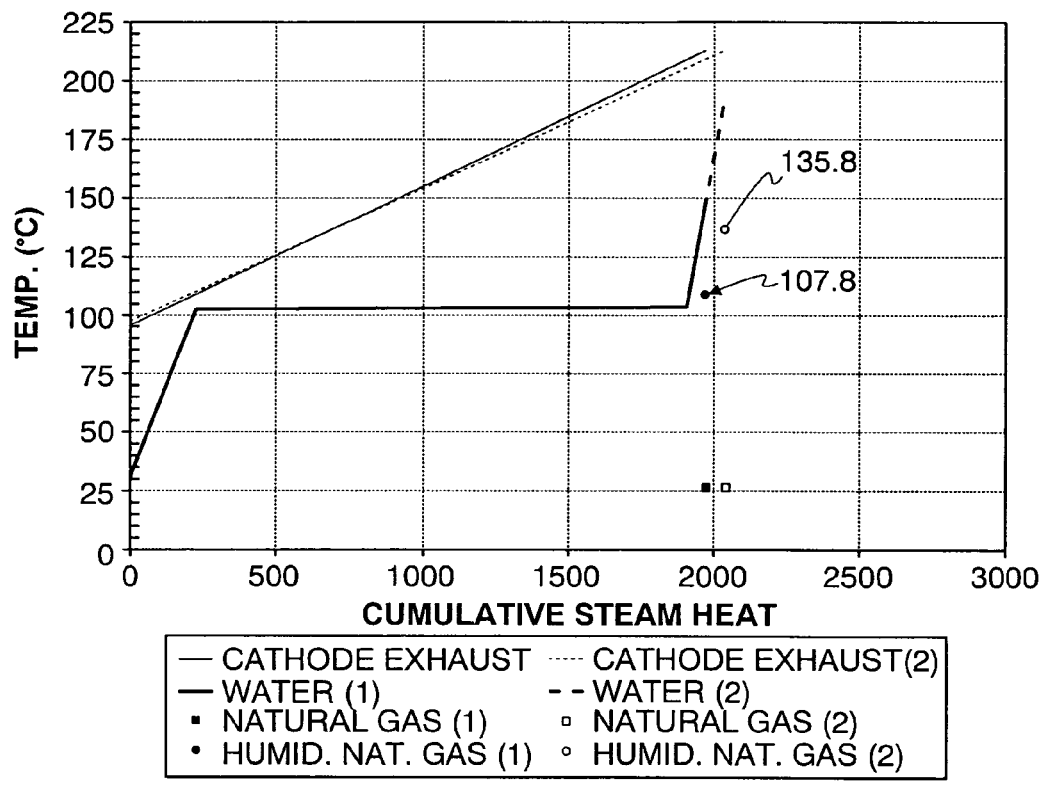

The inventors also discovered that by using the cathode exhaust stream for vaporizing the water, the amount of superheat in the steam exiting the evaporator 6 is very sensitive to the temperature and mass flow rate of the cathode exhaust stream entering the evaporator. This can be seen in FIG. 6, which shows the impact of a 4.5% increase in cathode exhaust stream mass flow (with the cathode exhaust stream temperature into the evaporator remaining unchanged) on the resulting humidified natural gas temperature.

The temperature of the humidified natural gas entering the fuel preheater 29 can be seen to increase by 28° C. due to this slight increase in cathode exhaust stream flow rate. This increase in temperature will result in a higher anode exhaust stream temperature exiting the fuel preheater, and subsequently a higher temperature exiting the water gas shift reactor 43 and entering the air preheater 39. This in turn leads to an increase in the cathode air preheat, which will tend to increase the temperature of the cathode exhaust stream entering the evaporator 6, thereby exacerbating the problem. The humidified natural gas temperature will continue to ratchet up, resulting in system stability problems, unless the inlet air flow rate is controlled. Thus, the cathode air (i.e., inlet air) flow rate needs to be controlled because it is one of the prime means of controlling the system 1.

In a second preferred embodiment, the previously mentioned potential stability problems may be reduced or eliminated by having an adjustable cathode exhaust bypass around the evaporator 6, through which a small portion of the cathode exhaust stream could be diverted in order to control the cathode exhaust flow rate through the evaporator 6. This solution uses active control of the fluid flow rate.

In a third preferred embodiment, a passive approach is used to reduce or eliminate the previously mentioned potential stability problems without the need for additional monitoring and control. The inventors have discovered that a temperature of the humidified natural gas entering the fuel preheater 29 can be made to be relatively insensitive to changes in the cathode exhaust stream flow rate and/or temperature by limiting the potential for increased superheat in the evaporator through a temperature pinch.

Figure 7:
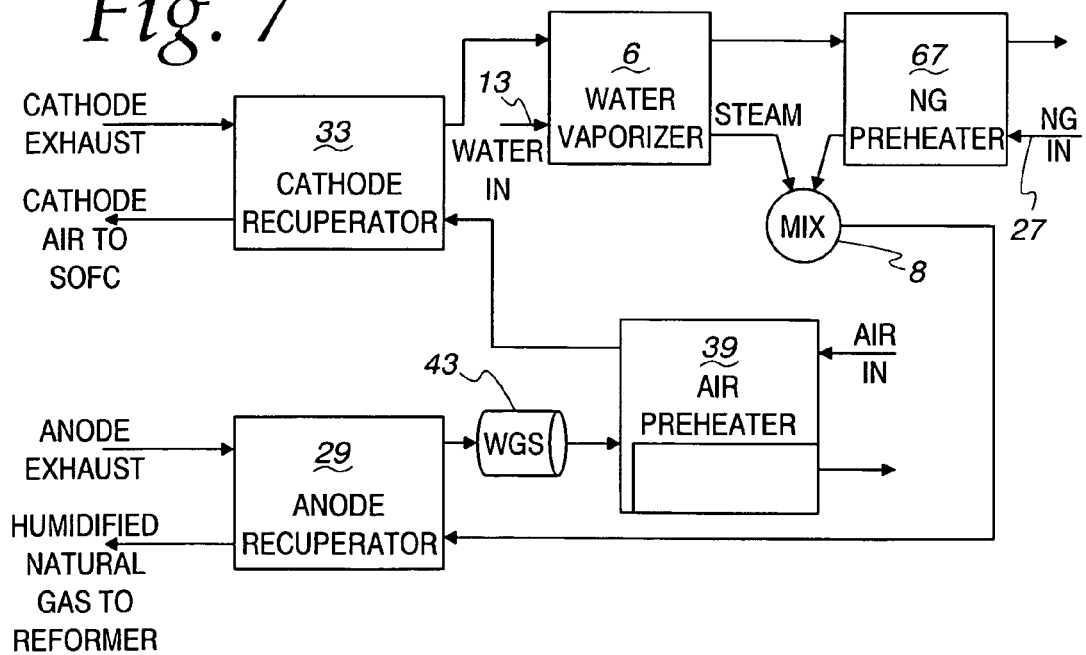
FIG. 7 shows the schematic of the heat exchanger network for the fuel cell system of the third preferred embodiment of the present invention.

FIG. 7 illustrates the heat exchanger portion of the system of the third preferred embodiment. The other parts of the system of the third preferred embodiment are the same as those of the first preferred embodiment shown in FIGS. 2 and 3.

As shown in FIG. 7, the direction of the water flow through the evaporator 6 is concurrent, rather than counter-current, with the flow of the cathode exhaust stream through the evaporator 6. Rather than having the temperature approach in the evaporator 6 located at the onset of the two-phase flow region, it is shifted to the end of the heat transfer region of the evaporator 6, where the temperature approach will "pinch" to a value of zero or closely approaching zero. No heat transfer between the streams will occur after this point, and the two fluids will exit at or near a common temperature. The cathode exhaust stream flow rate may need to be increased slightly in order to ensure that the heat capacity in the cathode exhaust stream is sufficient to achieve full vapor quality in the water. The water (i.e., steam) will then exit the evaporator 6 with some amount of superheat. The cathode exhaust stream exiting the evaporator 6 can then be used to preheat the fuel, such as natural gas in a second fuel preheater 67. Since the fuel inlet stream has a very small flow rate compared to the cathode exhaust stream, it is quite easy to achieve 100% effective heat transfer and preheat the fuel inlet stream to the same temperature as the water vapor and cathode exhaust stream exiting the evaporator.

Thus, as shown in FIG. 7, the system of the third preferred embodiment also contains the second fuel preheater 67. The fuel preheater 67 includes a first input 69 operatively connected to a cathode exhaust outlet 9 of the fuel cell stack 3, a second input 71 operatively connected to the fuel source 27, and a first output 73 operatively connected to the fuel inlet conduit 17. The second fuel preheater 67 is adapted to transfer heat from the cathode exhaust stream of the fuel cell stack to the fuel inlet stream being provided to the fuel cell stack 3. The evaporator 6 in the third preferred embodiment comprises a concurrent flow or "co-flow" evaporator in which the cathode exhaust stream and the water are adapted to flow in a same direction, and an output of the evaporator is operatively connected to an inlet of the fuel preheater 67 such that the cathode exhaust stream flows from the evaporator 6 into the second fuel preheater 67.

Thus, the water and the cathode exhaust stream are preferably provided into the same side of the evaporator and flow concurrent to each other. The water is converted to steam in the evaporator 6 and is provided into the steam/fuel mixer 8. The cathode exhaust stream is provided from the evaporator into the second fuel preheater heat exchanger 67 where it heats the inlet fuel flow which is then provided through the mixer 8 and the first fuel preheater heat exchanger (anode recuperator 29) into the stack 3.

Figure 8:
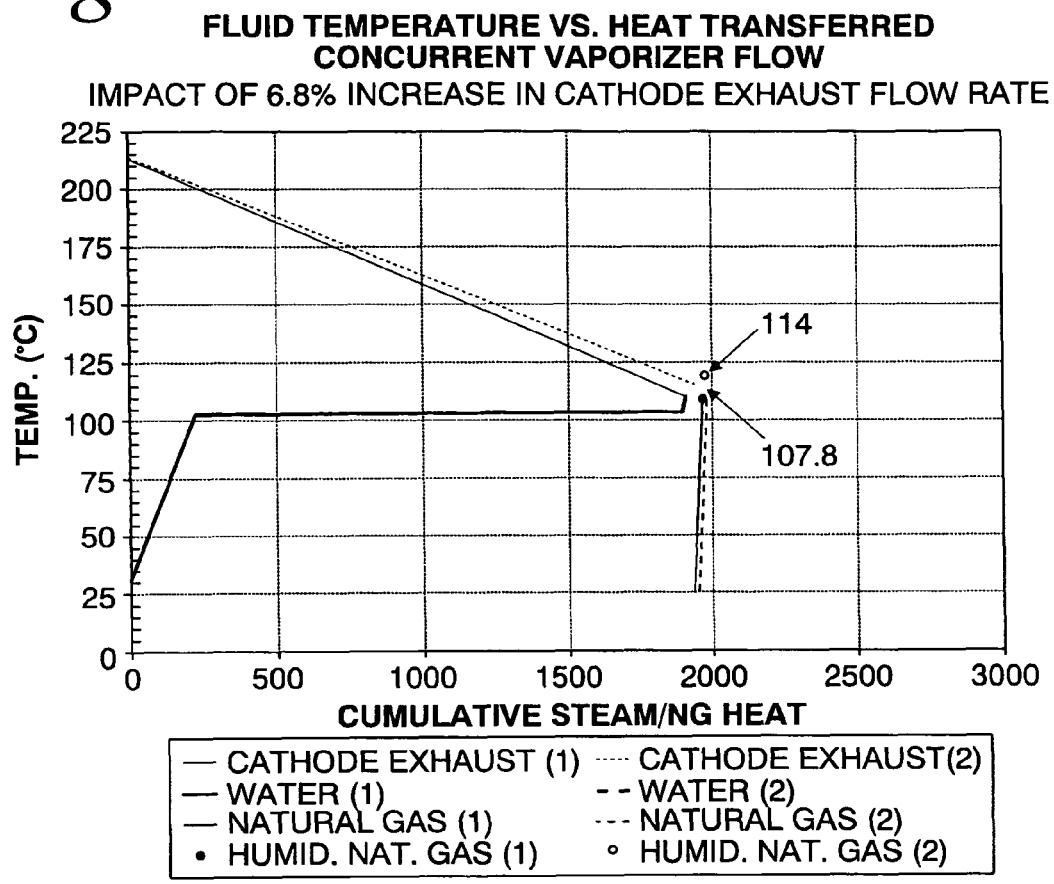

The system of the third preferred embodiment is substantially insensitive to variations in cathode exhaust stream temperature and mass flow. FIG. 8 shows that, for one analyzed embodiment, the humidified natural gas temperature entering the anode recuperator (i.e., first fuel preheater) 29 will increase by less than 7° C. due to a 6.8% increase in cathode exhaust stream mass flow in the system of the third preferred embodiment. Such a small temperature rise should not cause the temperature ratcheting described above, and therefore will result in system stability without the need for active control of the inlet air and/or cathode exhaust stream flow.

Thus, in the preferred embodiments of the present invention, water is evaporated using the heat from cathode exhaust stream. The air heat exchanger (i.e., cathode recuperator) is undersized so that the hot stream exits it at a high temperature of at least 200° C., such as 200° C. to 230° C. Air is fed into the system at a stoic of 2.5 and above to have enough exhaust heat for evaporating water needed for steam methane reformation. Preferably, between 2.5 and 6.5 times, more preferably between 3 and 4.5 times as much air is provided into the fuel cell stack as required for the fuel cell stack to generate electricity. The inlet air entering the cathode recuperator is preheated in the air preheater using the anode exhaust stream to reduce the load on the cathode recuperator. Water from the anode exhaust stream is partially condensed in the air preheater to reduce load in the anode condenser.

Figure 9:
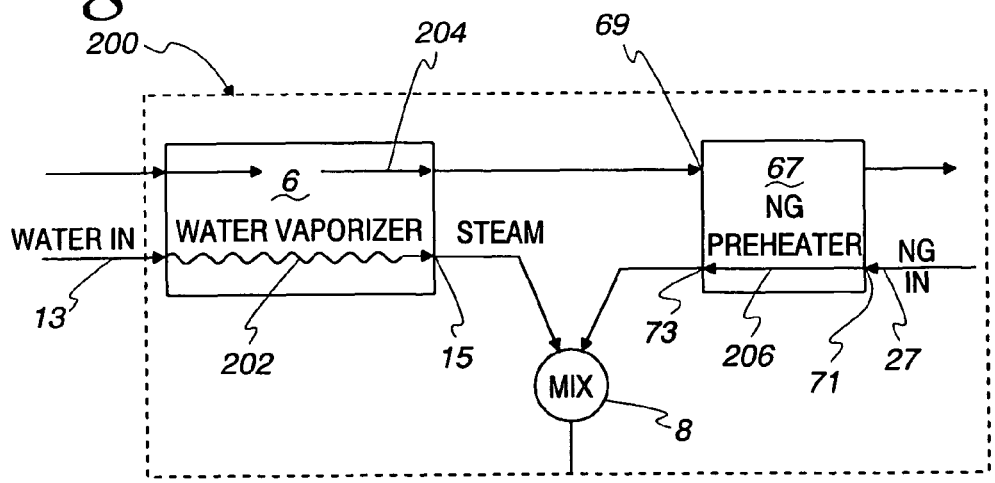
FIG. 9 shows a somewhat diagrammatic representation of an integrated fuel humidifier assembly of the invention.

With reference to FIG. 9, the fuel humidifier 5 is preferably provided in the form of an integrated assembly 200 that includes, as a single integrated unit, the water evaporator 6, a fuel heater or preheater, such as the fuel preheater 67, and the fuel/steam mixer 8 connected to both the water evaporator 6 to receive steam therefrom and the fuel heater 67 to receive heated fuel therefrom. The water evaporator 6 preferably includes a water flow path 202 in heat transfer relation with a heat carrying fluid flow path 204, which in the illustrated system is a cathode exhaust gas flow path, while the fuel heater includes a fuel flow path 206 also in heat transfer relation with the heat carrying fluid flow path 204, which again is the cathode exhaust gas flow path 204 for the illustrated system. The fuel/steam mixer 8 is connected to both the water flow path 202 to receive steam therefrom and to the fuel flow path 206 to receive heated fuel therefrom. As seen in FIG. 9, the fuel preheater 67 is preferably located downstream from the water evaporator 6 with respect to the heat carrying fluid flow path 204. However, in some applications, it may desirable for the fuel preheater 67 to be located upstream from the water evaporator 6 with respect to the heat carrying fluid flow path 204.

Figure 10:
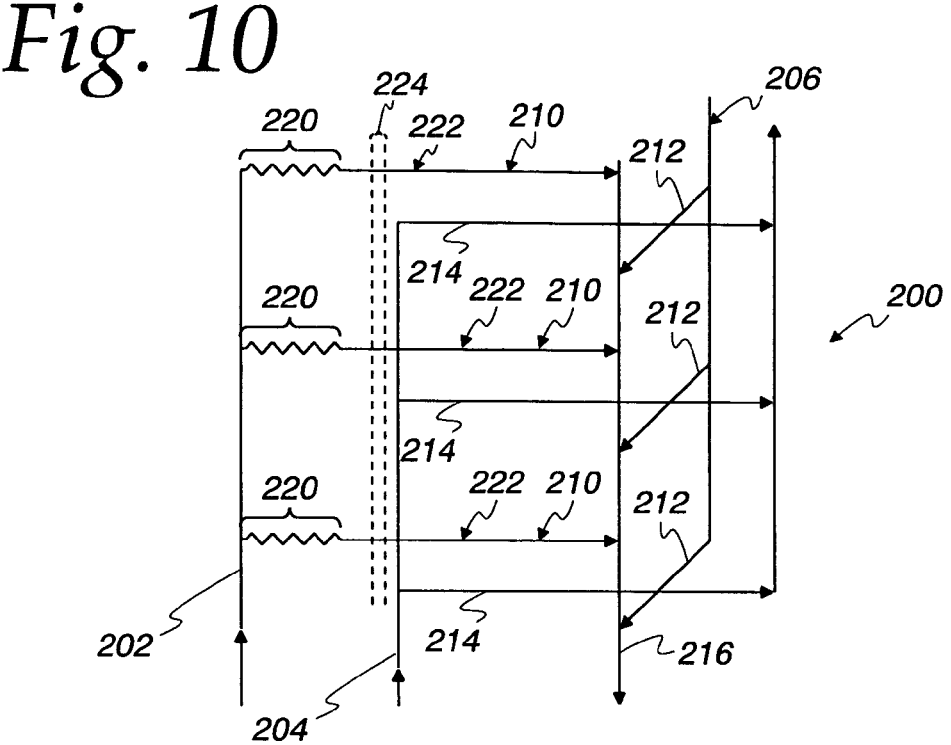
FIG. 10 is a somewhat diagrammatic representation illustrating the flow paths of the assembly of FIG. 9.

With reference to FIG. 10, in one preferred embodiment, the water flow path 202 preferably includes a plurality of parallel water flow passages 210, the fuel flow path 206 includes a plurality of parallel fuel flow passages 212 and the heat carrying fluid flow path 204 includes a plurality of parallel heat carrying fluid flow passages 214 interleaved with the water flow passages 210 in the water evaporator 6 and interleaved with the fuel flow passages 212 in the fuel heater 67. In further reference to FIG. 10, the fuel/steam mixture 8 preferably is in the form of a manifold or plenum 216 that is connected to all of the water and fuel flow passages 210 and 212.

It is preferred that each of the water flow passages 210 include a liquid pressure drop inlet region 220 that provides a greater pressure drop than the remainder 222 of the water flow passage 210 to help ensure proper distribution of the water flow to all of the water flow passages 210. However, while the regions 220 are preferred, in some applications it may be desirable for the water flow passages 210 to be free of any such regions 220.

It is also preferred that each of the regions 220 be thermally isolated from the heat carrying fluid flow path 206 by a thermal break, shown schematically at 224. The thermal break 224 acts to reduce conduction of heat to the pressure drop inlet regions 220 and preferably prevents or limits any vaporization of the water flow in the regions 220.

As seen in both FIGS. 9 and 10, the water flow and the heat carrying fluid flows have a concurrent flow relationship through the integrated assembly 200, the advantages of which were previously discussed herein and which include providing stability for the associated system because of the temperature pinch and making the system less sensitive to changes in the flow rate of the heat carrying fluid, as well as temperature changes in the heat carrying fluid. While the concurrent flow arrangement is preferred, in some applications it may be desirable for the flow to be arranged so as to provide a counter-current relationship, which can possibly allow for a lower flow rate and/or inlet temperature for the heat carrying fluid flow in comparison to the concurrent flow relationship, or a higher humidified fuel outlet temperature.

Figure 11:
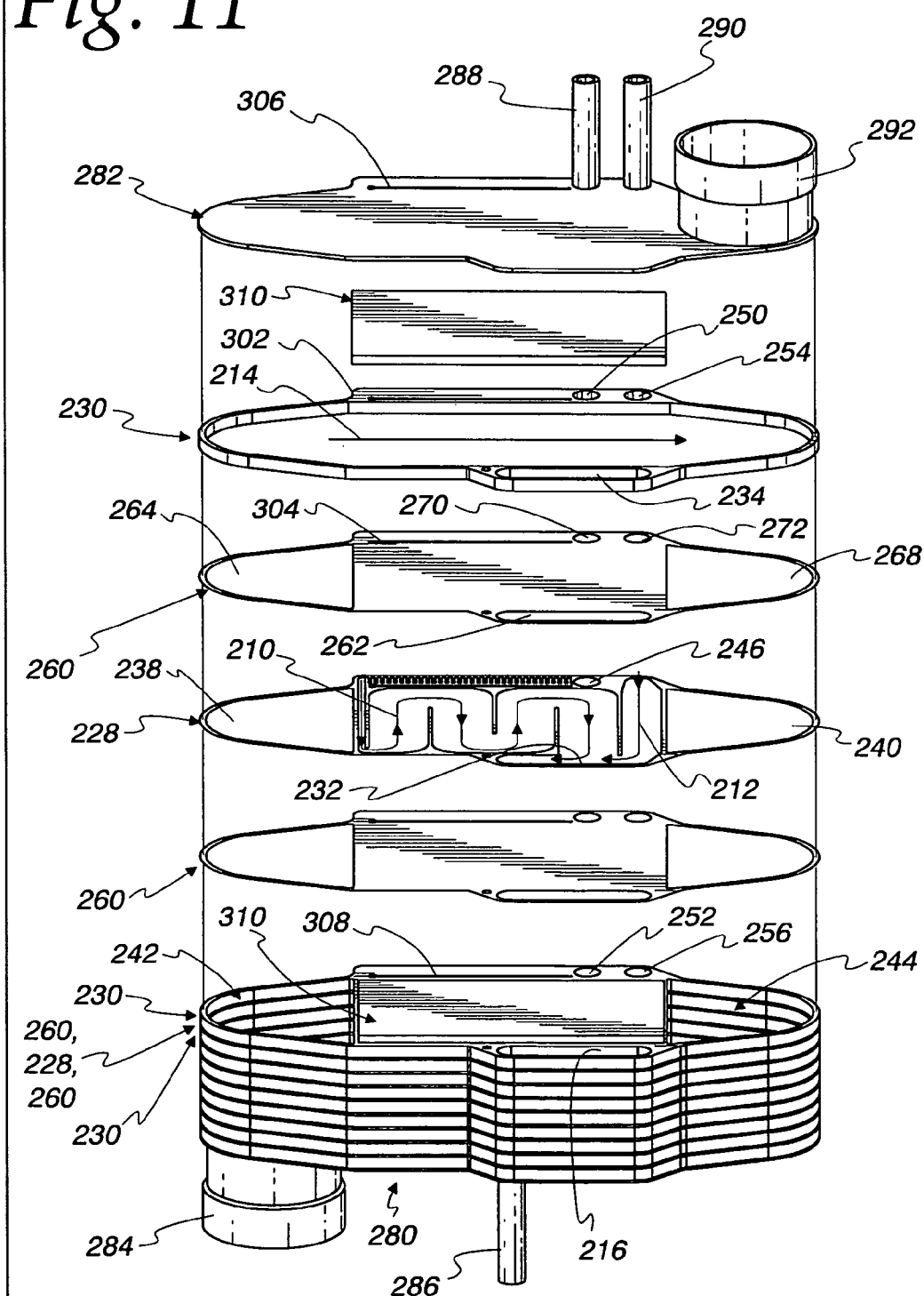
FIG. 11 is a partially exploded perspective view of one embodiment of the assembly of FIG. 9.

FIG. 11 shows one preferred embodiment of the integrated fuel humidifier assembly 200. This embodiment utilizes a so-called stacked plate construction and includes a plurality of water/fuel plates or sheets 228 interleaved with a plurality of heat carrying fluid plates or frames 230, with each of the water/fuel plates defining one of the water flow passages 210 and one of the fuel flow passages 212, and each of the heat carrying fluid plates 230 defining one of the heat carrying fluid passages 214.

Each of the water/fuel plates 228 further includes a water/fuel mixing chamber 232 that is open to both of the passages 210 and 212 to receive steam and heated fuel, respectively, therefrom. Each of the heat carrying fluid plates 230 also includes a water/fuel mixing chamber 234 that is closed from the heat carrying fluid flow passage 214. The chambers 232 and 234 are aligned to form the water/fuel mixing plenum 216 that extends through all of the plates 228 and 230.

Each of the water/fuel plates 228 further includes a pair of heat carrying fluid bypass openings 238 and 240 that are closed to the passages 210 and 212 in the water/fuel plate 228. The openings 238 and 240 in each of the plates 228 are aligned with the opposite ends, respectively, of the heat carrying fluid flow passages 214 in the heat carrying fluid plates 230 to form a heat carrying fluid inlet manifold 242 and a heat carrying fluid exit manifold 244, respectively, that extend through all of the plates 228 and 230 to direct the heat carrying fluid into and out of, respectively, the passages 214.

Each of the water/fuel plates 228 also includes a water inlet opening 246, with the openings 246 being aligned with each other and a water bypass opening 250 in each of the heat carrying fluid plates 230 to form a water inlet manifold 252 that extends through all of the plates 228 and 230.

Each of the heat carrying fluid plates includes a fuel bypass opening 254, with the openings 254 aligned with an end of the fuel flow passage 212 in each of the water/fuel plates 228 opposite from the chamber 232 to form a fuel inlet plenum or manifold 256 that extends through all of the plates 228 and 230 to supply fuel to each of the passages 212.

The assembly 200 also includes separator sheets 260 that are interleaved between each of the plates 228 and 230 in order to seal their respective flow passages from each other, as is known in stacked plate heat exchanger constructions. Each of the separator sheets 260 has openings 262, 264, 268, 270 and 272 that are aligned with and correspond to the chambers 232 and 234, the bypass openings 238, the bypass openings 240, the water inlet openings 246 and bypass openings 250, and the fuel bypass openings 254, respectively.

The assembly 200 also includes a pair of end plates 280 and 282 that sandwich the plates 228 and 230 and sheets 260 to seal the assembly 200 in a fluid tight manner. The end plate 280 includes a heat carrying fluid inlet connection or port 284 that is aligned with the heat carrying fluid inlet manifold 242 to direct heat carrying fluid thereto, and a humidified fuel outlet connection or port 286 that is aligned with the water/fuel mixing plenum 236 at an end of the plenum 236 opposite from the openings to the passages 210 and 212 to direct humidified fuel from the plenum 236. The end plate 282 includes a water inlet connection or port 288 that is aligned with the water manifold 252 to supply the water flow thereto, a fuel inlet connection or port 290 that is aligned with the fuel manifold 256 to supply the fuel flow thereto, and a heat carrying fluid outlet connection or port 292 that is aligned with the outlet manifold 244 to direct heat carrying fluid therefrom.

Figure 12:
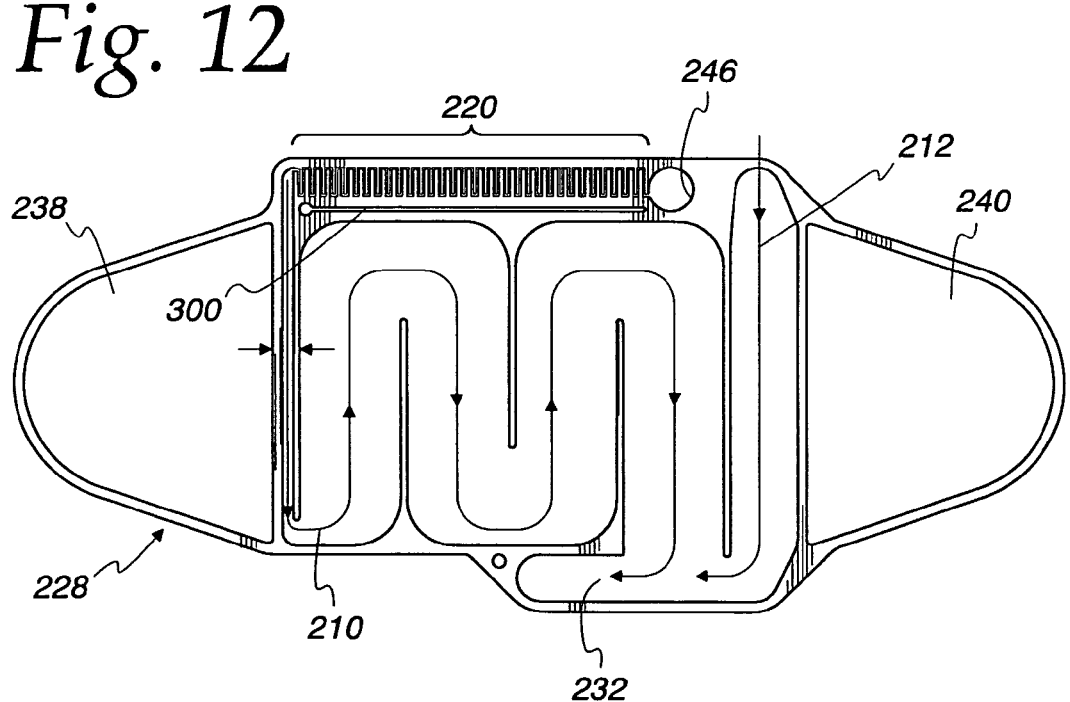
FIG. 12 is a plan view of a heat exchanger plate of the assembly of FIG. 11.

As best seen in FIG. 12, the passage 210 is defined by a continuous slot that extends from the water inlet opening 246 to the water/fuel mixing chamber 232, with the slot being open to both faces of the plate 228. Similarly, the fuel passages 212 is defined by a continuous slot that extends from the fuel inlet manifold 256 to the water/fuel mixing chamber 232, again with the slot being open to the opposing faces of the water/fuel plate 228. With reference to both FIGS. 11 and 12, the pressure reduction region 220 of the passage 210 is defined by a portion of the slot that is formed in a tight serpentine pattern with a relatively narrow slot width, which together provide a tortuous flow path. The water passage 210 then continues to a more open region of the slot where vaporization of the water occurs. In this regard, the initial length of the slot adjacent the pressure reduction region 220 has a reduced width in order to avoid separation of the water flow as it moves from the pressure reduction region 220 to the remainder 222 of the flow passage 210, with the passage 210 widening further as it extends to the chamber 232.

As best seen in FIG. 12, each of the water/fuel plates 228 also includes the thermal break 224 in the form of a slit or slot 300 that extends for the length of the pressure drop inlet region 220 between the pressure reduction region 220 and the remainder 222 of the water flow passage 210. As seen in FIG. 11, each of the heat carrying fluid plates 230 includes a corresponding slit or slot 302, each of the separator sheets 260 includes a corresponding slit or slot 304, and each of the end plates 282 includes a corresponding slit or slot 306, with all of the slits 300,302,304,306 being aligned throughout the stack to form a plenum 308 that extends through the stack and is open to atmosphere. As previously discussed, the thermal break 224 acts to minimize conduction of heat to the pressure drop inlet region 220 and preferably prevents or limits any vaporization of the water flow in the pressure reduction region 220 to ensure that the water flow remains in the liquid phase in the pressure reduction region 220. This is desirable because if the water is allowed to evaporate, a high pressure drop could be produced in the narrow passages of the pressure drop inlet region 220 and that pressure drop could dominate. While the thermal break 224 is preferred, in some applications it may be desirable not to have the thermal break 224 in the assembly 200.

As seen in both FIGS. 11 and 12, the flow passage 210 directs the water flow in a globally concurrent flow relationship with the heat carrying fluid flow in the passage 214, but is formed with a serpentine configuration so as to provide localized cross flow with respect to the heat carrying fluid flow in the passage 214, thereby improving the transfer of heat to the water while still providing the desired concurrent flow relationship.

Preferably, each of the flow passages 214 includes extended surfaces, which in the illustrated embodiment are shown in the form of a fin or turbulator insert 310, many suitable types of which are known. Extended surfaces may also be provided in the flow passages 210 and 212, but are not shown in the illustrated embodiment.

Figure 13:
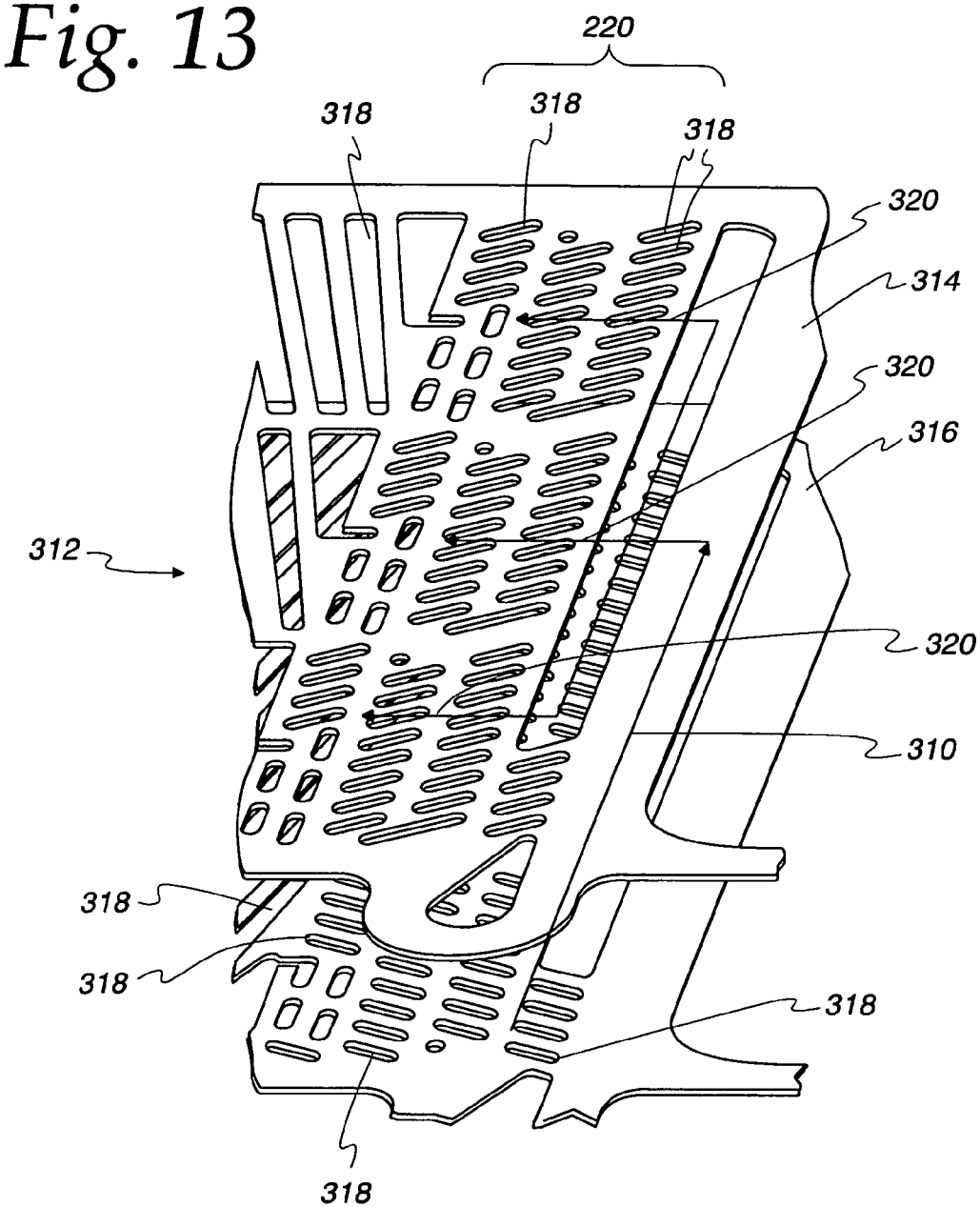
FIG. 13 is a partial, exploded perspective view of a heat exchanger plate pair for use in one embodiment of the assembly of FIG. 9.

With reference to FIG. 13, a water/fuel plate pair 312 is shown to illustrate one alternate embodiment for forming the water flow passage 210. Each plate 314, 316 of the plate pair 312 includes a plurality of discrete slots 318 that are arranged so as to overlie portions of corresponding discrete slots 318 in the opposite plate to form the water flow passage 210, with the water flowing from one of the slots 318 in one of the plates 314, 316 to a corresponding slot 318 in the opposite plate 314, 316 and then from that corresponding slot 318 back to a second corresponding slot 318 in the first plate 314, 316 and so forth until the water flows into the water/fuel mixer 8. The pressure reduction region 220 in this embodiment is defined by multiple ones of the slots 318, each of a relatively narrow width and short length, thereby requiring multiple changes in flow direction and providing the tortuous flow path. For the particular arrangement of slots in FIG. 13, the water flow passage 210 is divided into three parallel legs 320, but it should be understood that such a configuration is optional and will be highly dependent upon the requirements of each application. It should also be appreciated that a plurality of the plate pairs 312 of appropriate shape and size could be substituted for the water/fuel plates 228 in the embodiment shown in FIGS. 11 and 12.

While a couple of preferred embodiments for the assembly 200 have been shown and described in connection with FIGS. 11-13, it should be understood that any suitable heat exchanger construction can be utilized to form the assembly 200, including, for example, plate and bar type constructions, drawn cup constructions, nested plate constructions, and constructions that incorporate discrete heat transfer tubes. It should also be appreciated that the particular type of heat exchanger construction employed will be highly dependent upon the particular requirements of the system in which the integrated humidifier assembly 200 is employed. In this regard, it should be understood that while the integrated fuel humidifier assembly 200 has been described herein in connection with the fuel cell system 1, the integrated fuel humidifier assembly may find use in many other types of systems, and that no limitation to a fuel cell system is intended unless expressly recited in the claims.

While the integrated assembly 200 may be made utilizing any suitable material for the particular application, when employed in the fuel cell system 1 it is preferred that the sheets 260 and plates 228, 230, 280, and 282 be formed from stainless steel or another suitable corrosion-resistant alloy and be nickel-brazed or brazed using another suitable corrosion-resistant brazing alloy.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A fuel cell system, comprising:
   a fuel cell stack;
   a heat transfer device adapted to transfer heat from a cathode exhaust stream of the fuel cell stack to water to be provided to a fuel inlet stream;
   an air preheater which is adapted to preheat an air inlet stream using heat from an anode exhaust stream, wherein the anode exhaust stream is maintained separate from the cathode exhaust stream to preheat the air inlet stream; and
   a cathode recuperator heat exchanger configured to transfer heat from the cathode exhaust stream to the air inlet stream, while the cathode exhaust stream is separate from the anode exhaust stream;
   wherein the cathode recuperator has a size that is small enough such that the cathode recuperator heat exchanger is adapted to provide the cathode exhaust stream exiting the cathode recuperator heat exchanger at a temperature of at least 200° C.;
   wherein the cathode recuperator heat exchanger is operatively connected downstream from the air preheater.

2. The system of claim 1, wherein the air preheater is adapted to partially condense water vapor in the anode exhaust stream prior to the anode exhaust stream entering a condenser.

3. The system of claim 1, wherein the heat transfer device is configured to evaporate the water to steam that is to be provided to the fuel inlet stream, wherein the system further comprises:
   a mixer configured to mix the steam with the fuel inlet stream to provide a humidified fuel inlet stream; and
   an anode recuperator configured to heat the humidified fuel inlet stream using heat from the anode exhaust stream.

4. A fuel cell system, comprising:
   a fuel cell stack;
   a first means for evaporating water to steam using heat from a fuel cell stack cathode exhaust stream, wherein heat is not transferred from a fuel cell stack anode exhaust stream to evaporate the water to steam;
   a second means for providing the steam into a fuel inlet stream being directed to the fuel cell stack;
   a third means for heating an air inlet stream using the cathode exhaust stream upstream of evaporating the water and for providing an exiting cathode exhaust stream having a temperature of at least 200° C. after heating the air inlet stream; and
   a fourth means for heating the air inlet stream using a fuel cell stack anode exhaust stream prior to heating the air inlet stream using the cathode exhaust stream.

5. The fuel cell system of claim 4 wherein heat from the fuel cell stack cathode exhaust stream is exclusively utilized for evaporating water to steam.

6. The system of claim 4, wherein the second means provides the steam into the fuel inlet stream directed to the fuel cell stack to provide a humidified fuel inlet stream, wherein the system further comprises:
   a fifth means for heating the humidified fuel inlet stream using heat from the anode exhaust stream.

7. A method of operating a fuel cell system, comprising:
   operating a fuel cell stack to generate electricity;
   evaporating water to steam using heat from a fuel cell stack cathode exhaust stream;
   providing the steam into a fuel inlet stream being directed to the fuel cell stack;
   heating an air inlet stream using the cathode exhaust stream upstream of evaporating the water; and
   heating the air inlet stream using a fuel cell stack anode exhaust stream prior to heating the air inlet stream using the cathode exhaust stream, wherein the anode exhaust stream is maintained separate from the cathode exhaust stream to heat the air inlet stream.

8. The method of claim 7, further comprising partially condensing water vapor in the anode exhaust stream during the heating of the air inlet stream.

9. A method of operating a fuel cell system of claim 7 wherein heating the air inlet stream using the cathode exhaust stream upstream of evaporating the water is performed by maintaining the cathode exhaust stream separate from the anode exhaust stream.

10. The method of claim 7, wherein the step of providing the steam into the fuel inlet stream directed to the fuel cell stack provides a humidified fuel inlet stream, the method further comprising:

heating the humidified fuel inlet stream using heat from an anode exhaust stream.

11. A fuel cell system, comprising:

a fuel cell stack;

a heat transfer device adapted to transfer heat from a cathode exhaust stream of the fuel cell stack to water to be provided to a fuel inlet stream;

an air preheater which is adapted to preheat an air inlet stream using heat from an anode exhaust stream while the anode exhaust stream is separate from the cathode exhaust stream; and a cathode recuperator heat exchanger which is adapted to transfer heat from the cathode exhaust stream while the cathode exhaust stream is separate from the anode exhaust stream to the air inlet stream, the cathode recuperator heat exchanger operatively connected upstream from the heat transfer device with respect to the cathode exhaust stream and downstream from the air preheater with respect to the air inlet stream, and sized to provide the cathode exhaust stream to the heat transfer device at a sufficiently high temperature to allow for evaporation of the water in the heat transfer device;

wherein the cathode recuperator heat exchanger is sized to provide the cathode exhaust stream exiting the cathode recuperator heat exchanger at a temperature of at least 200° C.

12. The fuel cell system of claim 11 wherein only the anode exhaust stream is used to preheat the air inlet stream at the air preheater.

13. The fuel cell system of claim 11 wherein only the cathode exhaust stream is used to transfer heat to the air inlet stream at the cathode recuperator heat exchanger.

14. The system of claim 11, wherein the heat transfer device is configured to evaporate the water to steam that is to be provided to the fuel inlet stream, wherein the system further comprises:

a mixer configured to mix the steam with the fuel inlet stream to provide a humidified fuel inlet stream; and an anode recuperator configured to heat the humidified fuel inlet stream using heat from the anode exhaust stream.

* * * * *